Figure 1:
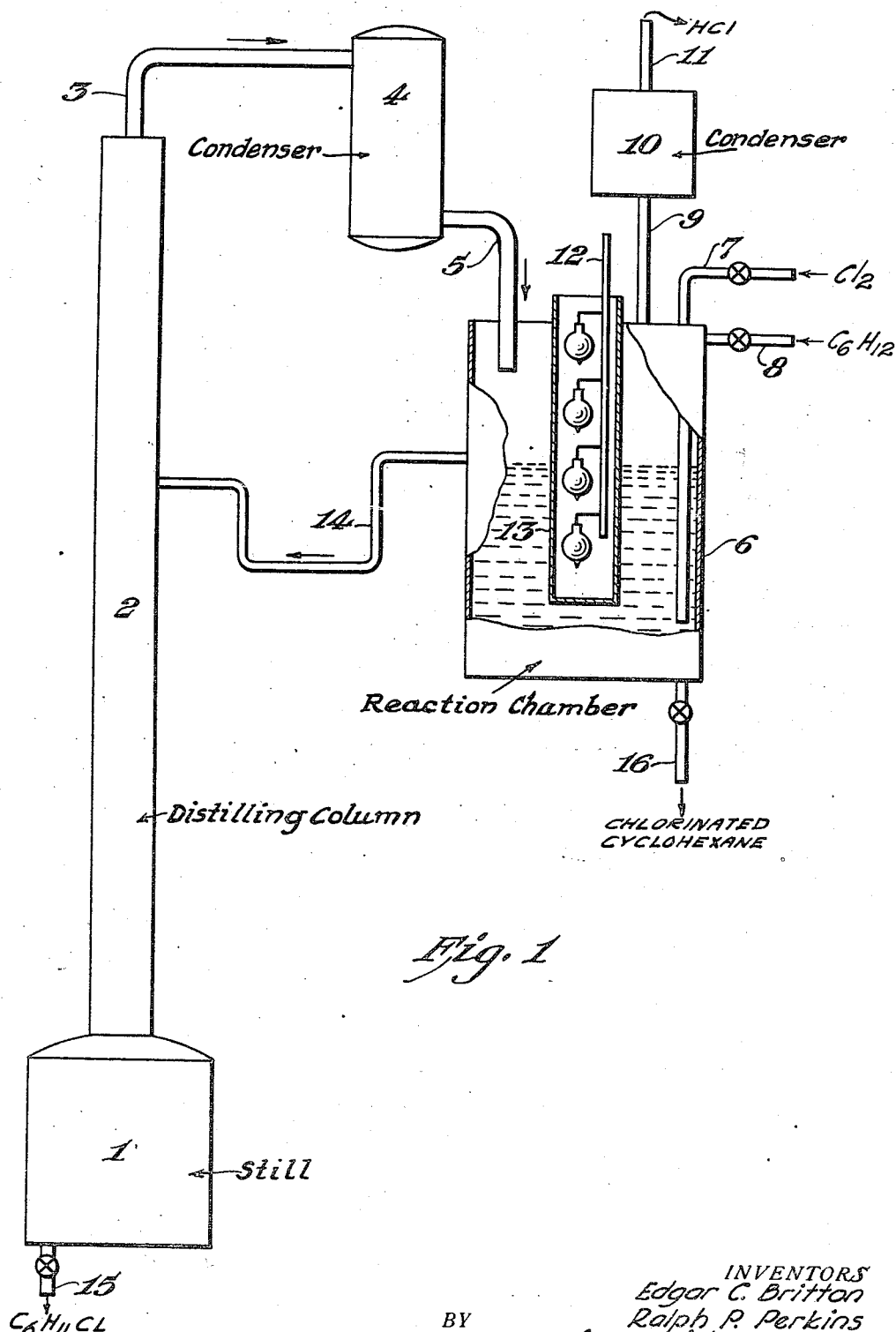

Patented June 23, 1942

2,287,665

UNITED STATES PATENT OFFICE 2,287,665

METHOD OF HALOGENATING CYCLOHEXANE

Edgar C. Britton and Ralph P. Perkins, Midland, Mich., assignors to The Dow Chemical Company, Midland, Mich., a corporation of Michigan Application March 9, 1938, Serial No. 194,916

2 Claims. (Cl. 260—648)

This invention concerns an improved method of halogenating cyclohexane to obtain a desired monohalo- or polyhalo-cyclohexane as the major product. It particularly concerns the manufacture of monochloro-cyclohexane, i. e. cyclohexyl chloride, by direct chlorination of cyclohexane.

Cyclohexyl chloride and cyclohexyl bromide have heretofore been prepared by two general methods, viz.; direct halogenation of cyclohexane and reaction of hydrochloric or hydrobromic acid with cyclohexanol. The method involving direct halogenation of cyclohexane has found little, if any, commercial application due to the fact that polyhalo-cyclohexanes are formed in considerable yield when the halogenation is carried far enough for practical operation. For instance, Markownikoff, Ann. 302, 9 (1898), has shown that when cyclohexane is reacted in batch manner with not over 50 per cent of its molecular equivalent of chlorine, the product consists largely of polychloro-cyclohexane. Sabatier and Maihle, Compte Rendus 137, 240 (1903), carried the reaction out at 0° C., under the catalytic action of light, but found that the organic product was principally polychloro-cyclohexane. Faragher and Garner, J. A. C. S. 43, 1715 (1921) reacted cyclohexane with between 50 and 75 per cent of its molecular equivalent of chlorine under the influence of light at a temperature between 20° and 25° C., but obtained cyclohexyl chloride in less than 55 per cent based on the cyclohexane consumed.

Because of such difficulties, cyclohexyl halides are usually prepared by reacting cyclohexanol with a desired hydrogen halide. This method, although giving rise to less byproduct formation than occurs in the halogenation of cyclohexane, is objectionable from a manufacturing view point in that cyclohexanol is a far more expensive starting material than cyclohexane so that the cost of the cyclohexyl halide product is high.

An object of this invention is to provide a simple and economical method for carrying out the halogenation of cyclohexane, whereby a cyclohexyl halide or a desired polyhalo-cyclohexane may be produced in good yield.

The invention consists essentially in a cyclic mode of operation, wherein the halogen, e. g. chlorine or bromine, is introduced gradually into cyclohexane under conditions which will permit reaction, but the liquid reaction mixture is at the same time continuously withdrawn from the reaction zone and unreacted cyclohexane is separated from the halo-cyclohexane product and returned to the reaction.

The invention also comprises other important features. For instance, we have found that metal surfaces of equipment to be contacted with the reaction mixture may advantageously be composed of nickel, lead, or Monel metal. Surfaces of iron, boiler plate, Invar steel, etc., are corroded appreciably by halogenated cyclohexane under the conditions of operation and the corrosion products direct the halogenation toward formation of polyhalogenated products. Nickel, however, is attacked to slight extent, if at all. Monel metal is attacked only slightly and the corrosion products do not influence appreciably the reaction between a halogen and cyclohexane. Lead is at first corroded to limited extent, but the corrosion practically ceases after the reaction has proceeded for a short time and the products of such corrosion appear to catalyze introduction of a single halogen atom into the cyclohexane nucleus.

We have also found in the manufacture of a cyclohexyl halide, that the polyhalo-cyclohexane by-products may advantageously be used to scrub vaporized cyclohexane from the gaseous hydrogen halide evolved in the reaction.

In addition, we have devised a batch method for carrying out the cyclic process which, because of its simplicity, is well adapted to use either in the laboratory or on a manufacturing scale and also a continuous mode of operation which is better adapted for the large scale manufacture of cyclohexyl halides.

Figure 2:
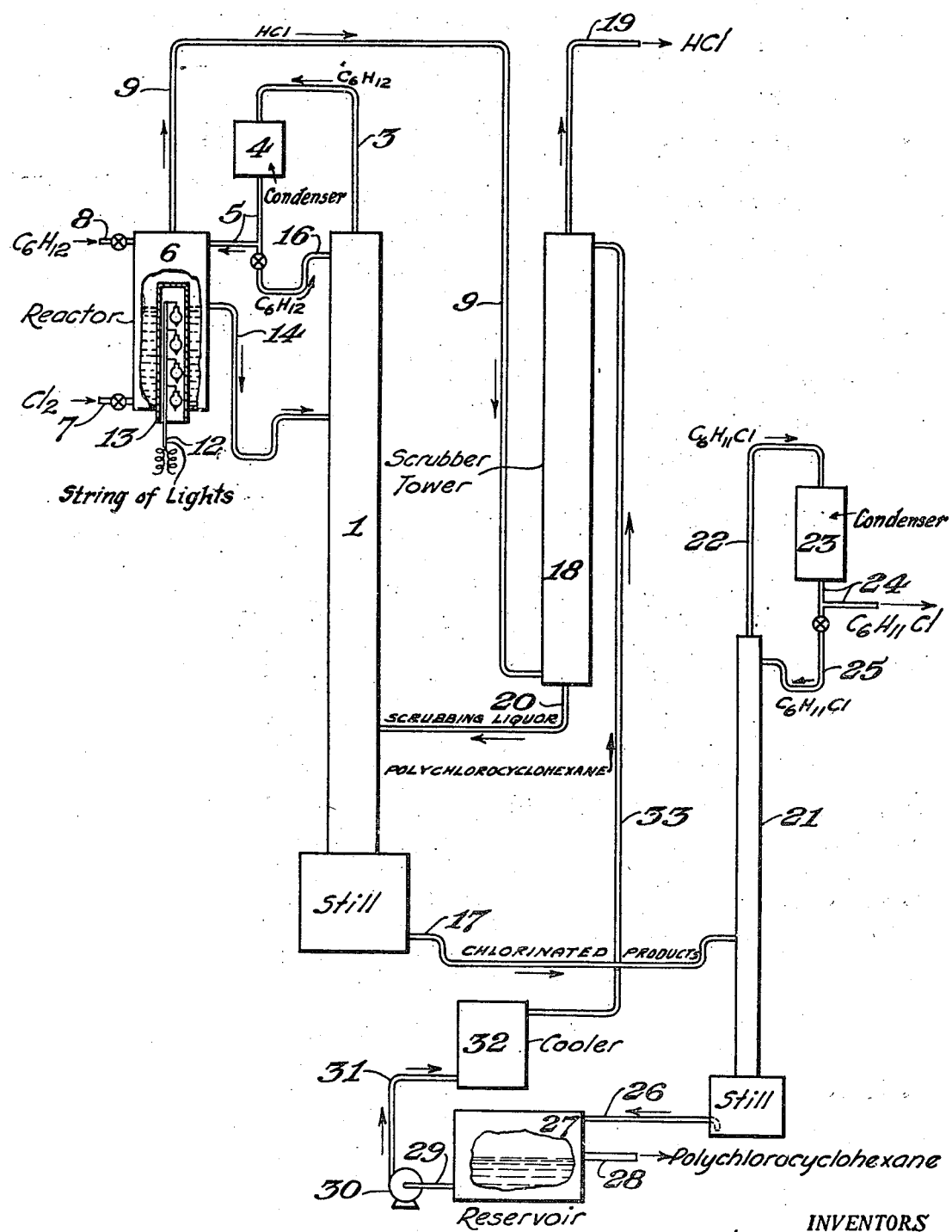

The accompanying drawings illustrate certain of the various forms of apparatus which may be employed in practicing the invention. Figure 1 of the drawings shows a simple form of apparatus which may be used when operating in batch manner. Figure 2 shows apparatus for the continuous production of cyclohexyl halides in accordance with the invention.

In Figure 1, numeral 1 indicates a still provided with a distilling column 2. Vapor line 3 leads from the top of the column 2 to a condenser 4, from which a conduit 5 for the condensate connects with the upper portion of a reaction chamber 6. The latter is provided with a chlorine inlet 7 which projects below the normal liquid level inside the chamber, an inlet 8 for cyclohexane, and with a gas line 9, which connects with a vertical condenser 10 having a vent 11. Chamber 6 is also provided with a source of light, 12, e. g. a string of electric lights, encased in a tube 13, of glass or other transparent material, which tube projects into the chamber 6. Leading from one side of reaction chamber 6 is conduit 14, in the form of a U tube, which connects with the distilling column 2 and permits liquor to overflow from chamber 6 and drain to the still 1. The still 1 and the chamber 6 are provided at the bottom with the drains, 15 and 16, respectively.

In Figure 2, the numerals 1, 3, 4, 5, 6, 7, 8, 9, 12, 13 and 14 represent elements corresponding to the elements designated by the same numerals in Figure 1, except that in Figure 2, the still 1 is a continuous type including both a column and a heating means (not shown) near the bottom thereof, the conduit 5 for return of distillate to reaction chamber 6 is provided with valved branch 16 connecting with the top of still 1, and the vapor line 9 leading from the top of chamber 6 connects with the lower portion of a scrubbing tower 18 which is provided at its top with a gas vent 19. The continuous still 1 of Figure 2 is provided near its lower end with a line 17 connecting with another continuous still 21. The latter is provided near its top with a vapor outlet 22 which connects with a condenser 23. Condenser 23 is provided with an outlet line 24 for withdrawing distillate from the system, but the line 24 is provided with a valved branch 25 which connects with the top of still 21 and permits return of a portion of the distillate to the still for purpose of reflux. At the bottom of still 21 is a conduit 26 which connects with a reservoir 27 and permits high boiling liquid to drain from the still to the reservoir. The latter is fitted at one side with an overflow drain 28 and near its bottom with a conduit 29 which connects with a pump 30 which in turn is connected by means of conduit 31 with a cooling device 32. A conduit 33 connects device 32 with the upper part of scrubbing tower 18 and the latter is provided at its bottom with a drain line 20 which connects with the continuous still 1.

In the manufacture of cyclohexyl chloride using the apparatus illustrated in Figure 1 of the drawings, cyclohexane is charged into reaction chamber 6 through inlet 8 until the still 1 is at least partially filled by overflow from said chamber. Inlet 8 is then closed and the still 1 is put into operation, thereby causing circulation of cyclohexane from the still to the reaction chamber 6 via column 2, conduit 3, condenser 4, and conduit 5, and back into the still by way of overflow line 14. The electric lights 12 are illuminated and chlorine is introduced continuously through inlet 7 into chamber 6. The rate of chlorine input is balanced against the rate of cyclohexane circulation so that not more than 0.3 mole, preferably 0.1 mole or less, of chlorine enters chamber 6 per mole of cyclohexane entering said chamber by distillation from the still 1. The chlorination starts at room temperature after which the temperature usually rises spontaneously to between 40° and 80° C. The exact temperature employed is of little consequence. Hydrogen chloride gas generated by the reaction passes through conduit 9 into an efficient condenser 10 wherein cyclohexane which may be vaporized with the gas is condensed and permitted to flow back into chamber 6. The hydrogen chloride is vented through outlet 11 into suitable receivers wherein it is collected as by-product of the reaction. During operation in such manner, a liquid mixture of cyclohexyl chloride and unreacted cyclohexane continuously overflows from reaction chamber 6 to the still 1 which is operated in such manner as to distill the cyclohexane back into chamber 6, but retain the cyclohexyl chloride. Toward the end of the chlorination, the distilling temperature rises quite rapidly and approaches the boiling point of cyclohexyl chloride, i. e. 139–143° C. The chlorination is then stopped and the reaction liquor is removed from the system through drains 15 and 16 and fractionally distilled to obtain the cyclohexyl-chloride product in purified condition.

The apparatus shown in Figure 2 of the drawings operates on the same general principal as that shown in Figure 1, although the details of operation are quite different. In using the apparatus of Figure 2, chlorine and cyclohexane are introduced continuously into reaction chamber 6 through inlets 7 and 8, respectively. The hydrogen chloride gas generated leaves chamber 6 through conduit 9 from which it enters scrubbing tower 18, wherein it is scrubbed with polychloro-cyclohexanes to remove any vaporized cyclohexane, and finally is vented through outlet 19 into suitable receivers. The reaction liquor overflows into continuous still 1 which is operated in such manner that cyclohexane is distilled off through line 3, condenser 4, and line 5 back into the reaction chamber 6 and chlorinated cyclohexane drains continuously through line 17 into another continuous still 21. During operation, the rates of chlorine and cyclohexane input through inlets 7 and 8 and the rate of distillation of cyclohexane from still 1 to chamber 6 are controlled so that the molecular ratio of chlorine to cyclohexane entering chamber 6 does not exceed 0.3 and is preferably less than 0.1. In still 21, the chlorinated cyclohexane is fractionated to separate the cyclohexyl chloride product which passes from the still through vapor line 22, condenser 23 and outlet 24. A portion of the distillate is returned to the still through line 25 for purpose of reflux. Polychloro-cyclohexane drains continuously from still 21 through liquor line 26 into storage tank 27 from which it is pumped by means of pump 30 through lines 29 and 31, cooler 32 and line 33 into the top of scrubbing tower 18 wherein it serves to extract vaporized cyclohexane from the hydrogen chloride evolved from the reaction mixture. The polychloro-cyclohexane entering tower 18 is cooled preferably below 20° C. in order to obtain efficient scrubbing. The scrubbing liquor drains from tower 18 through conduit 20 into still 1 wherein the dissolved cyclohexane is distilled therefrom. As polychloro-cyclohexane accumulates beyond the amount required for operation, it overflows from the system through outlet 28.

Using the apparatus of Figure 1 or Figure 2 of the drawings, the invention as hereinbefore described may be applied to the production of cyclohexyl bromide by substituting bromine for chlorine as the halogenating agent. If desired, it may also be applied to the production of a given polyhalo-cyclohexane, e. g. dichloro-cyclohexane, trichloro-cyclohexane, or dibromo-cyclohexane, etc., in good yield by merely controlling the distillation of the crude reaction liquor so that material of boiling point below that of the desired product is continuously distilled back into the reaction chamber, but the product desired is not returned to said chamber.

Although light is preferred as a catalyst for the halogenation, any halogenation catalyst which distills at a temperature below the boiling point of the desired product may be used. For instance, we have successfully produced cyclohexyl chloride without aid of light by using phosphorus tri-chloride as the catalyst. The phosphorus tri-chloride circulated along with the unreacted cyclohexane and was thereby continuously returned to the reaction.

When light is used as the catalyst, it must, of course, be employed in intensity sufficient to promote rapid reaction. We have observed that light of wave length between 5200 and 5400 Angstrom units is most effective as a catalyst for the chlorination of cyclohexane.

The following examples illustrate certain ways in which the principle of the invention has been applied, but are not to be construed as limiting the invention.

*Example 1*

Employing laboratory apparatus similar in construction to that illustrated in Figure 1 of the drawings, 1680 grams (20 moles) of cyclohexane was reacted with 1120 grams (7.0 moles) of bromine during a period of 20.5 hours. During reaction, the bromine was introduced to the reactor at a constant rate of approximately 55 grams (0.34 mole) of bromine per hour and unreacted cyclohexane was cycled through the reactor at such rate that approximately 20 moles of cyclohexane entered the reactor for each mole of bromine entering the same. The reaction was catalyzed by light from a 100 watt electric light bulb placed at a distance of about 3 inches from the reaction mixture. The reacted mixture was then fractionally distilled, there being separated 1180 grams (14.05 moles) of unreacted cyclohexane, 603 grams (3.7 moles) of substantially pure cyclohexyl bromide, and 132.9 grams of more highly brominated products. Of the brominated products obtained from the reaction, approximately 86 per cent by weight was cyclohexyl bromide.

*Example 2*

Cyclohexane was chlorinated under exposure to light by procedure and in apparatus similar to those of Example 1. The rate of chlorine input and the rate at which cyclohexane was distilled from the reaction liquor and returned to the reactor were controlled so that the molecular ratio of chlorine to cyclohexane entering the reaction chamber was approximately 0.03. The reaction was carried out at temperatures between 55° and 65° C. and was continued until the distillate returning to the reactor distilled at a temperature considerably above the boiling point of cyclohexane and approaching that of cyclohexyl chloride, by which time more than half of the chlorine theoretically required to convert all of the cyclohexane to cyclohexyl chloride had been reacted. The chlorination was then stopped and the product was separated by distillation. The yield of cyclohexyl chloride was approximately 94.5 per cent of theoretical, based on the cyclohexane reacted.

*Example 3*

948 grams (8.0 moles) of cyclohexyl chloride was cycled through the apparatus employed in Example 1 at such rate that 20 grams (0.17 mole) of cyclohexyl chloride passed into the reactor per minute. Chlorine was admitted to the reactor at a rate of about 0.70 grams (0.0099 mole) per minute. During reaction, the mixture within the reactor was illuminated with light from a 100 watt electric light bulb placed at a distance of about 2 feet from said mixture and the latter was maintained at a temperature between about 50° and 55° C. Chlorination was continued until the material passing from the still had a boiling point of 152° C. The mixture was removed from the apparatus and blown with air to remove hydrogen chloride therefrom. It was then completely neutralized with anhydrous sodium carbonate, filtered, and fractionally distilled. There was obtained 411 grams (3.47 moles) of unreacted cyclohexyl chloride, 577 grams (3.64 moles) of a mixture of isomeric dichloro-cyclohexanes boiling between 180° and 200° C. at atmospheric pressure, and 118 grams of more highly chlorinated products. Of the reaction products, 83 per cent by weight consisted of dichloro-cyclohexane.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method wherein a halogen selected from the class consisting of chlorine and bromine is reacted with liquid cyclohexane to produce a cyclohexyl halide, a polyhalo-cyclohexane and gaseous hydrogen halide, the step of scrubbing the hydrogen halide with the polyhalo-cyclohexane to extract vaporized cyclohexane therefrom.

2. In a continuous method for the production of a cyclohexyl halide, the steps which consist in introducing cyclohexane and not more than 0.3 of its molecular equivalent of a halogen selected from the class consisting of chlorine and bromine, into admixture, exposing the mixture to actinic light while contacting it with metal surfaces consisting only of a substantially inert metal, whereby the cyclohexane is halogenated, continuously withdrawing a portion of the reaction liquor and distilling the withdrawn liquor while in contact with metal surfaces consisting only of a substantially inert metal to distill off a cyclohexane fraction suitable for recycling in the process and leave a mixture of chlorinated cyclohexanes, distilling the chlorinated cyclohexanes to separate, a cyclohexyl halide fraction, and a polyhalo-cyclohexane fraction, and employing the last mentioned fraction as an agent for extracting vaporized cyclohexane from the gaseous hydrogen halide evolved by the reaction.

EDGAR C. BRITTON.
RALPH P. PERKINS.